United States Patent Office 3,544,484
Patented Dec. 1, 1970

3,544,484
OPTICAL pH INDICATOR COMPRISING AROMATIC AMINOAZO DYE AND INERT POLYMER CONTAINING CARBONYL RADICALS
Shirley H. Roth, Highland Park, N.J., assignor to American Standard Inc., New York, N.Y., a corporation of Delaware
No Drawing. Filed Dec. 18, 1967, Ser. No. 694,021
Int. Cl. G01n 21/08, 33/22
U.S. Cl. 252—408                         10 Claims

ABSTRACT OF THE DISCLOSURE

The invention relates to an indicator material for the use in visually measuring hydrogen ion concentration in aqueous solutions. The material comprises a colorimetrically pH sensitive aromatic aminoazo dye and a polymeric material selected from the group consisting of (1) polymers of unsaturated aldehydes having from 3–4 carbons; (2) graft copolymers of polyvinyl alcohol and an unsaturated aldehyde having from 3–4 carbon atoms.

The instant invention is concerned with the measurement and control of hydrogen ion concentration. More particularly, the invention is directed to an indicator material for visual measurement of hydrogen ion concentration in aqueous solutions.

Generally the pH, i.e., the hydrogen ion concentration, of a solution is measured by either colorimetric or electrometric methods which involve the observation of a color transition or the measurement of a potential difference. Recent improvements in electronic equipment have made electrometric measurements far more accurate and sensitive than visual methods. Small fractions of a pH unit can be easily measured with standard laboratory model pH meters; whereas the visual color change associated with a standard pH indicator occurs over a span of from one and one-half to two pH units. Optical techniques, however, can be improved through the use of electronic instruments for the detection of color transitions and the measurement of indicator spectra. The acid and basic forms of an indicator have different absorption spectra. By measuring the optical absorption of the acid or basic form of the indicator one can accurately determine the fraction of total indicator concentration in one form or the other and can calculate the pH. The measurement of absorption spectra can attain a degree of sophistication which matches that of pH measurement by potential difference.

To be satisfactory an optical pH indicator should respond rapidly to change in the pH. The indicator should be reversible and unaffected by factors other than the concentration of hydrogen ions. In addition, the transition from the acid form to the basic form and back again should not disturb the equilibrium of the system being monitored, e.g., the take up and release of hydroxyl and hydronium ions.

An object of this invention is to provide simple, easy-to-use pH indicator materials having advantages over pH paper.

Another object of the invention is to provide new compositions of matter which are useful for the measurement of the pH of an aqueous system.

Another object of the invention is to provide stable, reversible, and reusable pH indicator materials.

A further object of the invention is to provide polymeric indicator materials.

These and other related objects are achieved by providing compositions comprising a stable polymer and a pH sensitive dye. More specifically, these compositions comprise polymers which are stable to the acid-base system and which are characterized by the presence of carbonyl groups or carbonyl group reaction products as part of the polymeric structure. The term "polymer" as used herein is intended to refer to all types of polymers including homopolymers, copolymers, graft copolymers, interpolymers, and the like. Such carbonyl-containing polymers include polymers of unsaturated aldehydes, preferably aldehydes having from 3 to 10 carbon atoms in the alkenyl portion, e.g., acrolein, methacrolein, and the like. Suitable polymers can be prepared by free radical polymerization of the corresponding monomers. For example, polymethacrolein can be prepared by refluxing freshly distilled methacrolein with an equal quantity of benzene for a period of about three hours, in the presence of an effective amount of a polymerization catalyst, e.g., about 1 percent benzoyl peroxide.

A suitable polyacrolein is available from Shell Chemical Company under trademark Aldomer 110.

Other suitable carbonyl containing polymers can be prepared by grafting carbonyl compounds such as aldehydes and ketones, e.g., acrolein, methacrolein, and methyl vinyl ketone, onto a suitable polymer chain or backbone, e.g., polyvinyl alcohol. A preferred material is an unplasticized high molecular weight vinyl alcohol polymer which is insoluble in cold water but soluble in hot water and completely hydrolyzed. A suitable polyvinyl alcohol is available from Du Pont under the trademark Elvanol.

Suitable graft copolymers can be prepared by immersing heat-cured polyvinyl alcohol films in a bath containing the selected co-monomer in an acidified ethanol-water solvent. The graft copolymer reaction product is significantly different from the original polyvinyl alcohol polymer in that the product can be dyed whereas the original polyvinyl alcohol does not become colored in the dye solutions.

In preparing the indicator materials the carbonyl-containing polymeric material is treated with a suitable pH sensitive dye or indicator which can react with at least some of the carbonyl groups, preferably those on the surface of the polymer material, to form a dyed polymer, the color of which is dependent on the hydrogen ion concentration of the solution to which it is exposed.

Broadly, any pH sensitive dye capable of condensing with or forming a charge transfer complex with a carbonyl group can be used to form the indicator material of this invention. The dye should be present in the polymer-indicator combination in an amount which is sufficient to provide a distinct color transition. For example, the polymer film can be dipped into a dilute acetone solution containing about 0.1 gram of dye per 100 milliliters of acetone. Dipping can be repeated until proper coloration is obtained. Generally one or two dips is sufficient.

pH sensitive dyes which can be reacted with a carbonyl-containing polymer to form a pH sensitive polymeric indicator include aminoazo dyes characterized by the presence of a hydroxy group or at least one primary amine group of the formula $RNH_2$, wherein R can be any suitable hydrocarbon group, preferably at least one an aromatic group. A preferred group of pH sensitive dyes include alizarin, p-amino azobenzene, 4-amino-2′,3-dimethylazobenzene, 2-methoxy-4-(o-methoxyphenylazo)-aniline, p-amino-α,α′-azonaphthalene, benzeneazo-α-naphthylamine, 4-(p-aminophenylazo)-benzoic acid, and the like.

As pointed out above, the polymeric substrate can be combined or reacted with the acid sensitive dye by immersing the polymer in a dilute solution of the dye. Preferably acetone solutions are employed since the polymers color rapidly at room temperature in such solutions. Ethanol can also be used as a solvent, however, several hours of refluxing may be necessary to achieve proper coloration.

Accordingly, it will be appreciated that the above-mentioned pH indicators can be made permanent and reusable in a form which will not contaminate the solution or system being monitored, by combining the indicator with an inert and stable polymeric substrate. Such an indicator can be employed in a manner similar to the well known pH paper, however with the advantage of durability and reversibility. Moreover, the polymeric indicator can be installed in either a closed system or a continuously flowing system and used to monitor the pH of the system either visually or electronically. For example, the polymeric indicator can be used as the sensing element in a simple optical pH meter comprising a light source, a monochrometer, a photosensitive element, and a galvanometer. Such a combination can be used to open or close an electrical circuit and activate reagent-addition equipment. Alternatively, an electrical signal from the photodetector can be used to activate a transducer in a proportional pH control device and govern the addition of reagent to the system.

zene. After a short time the powder was filtered out and washed with ethanol. The dyed polyacrolein powder was rose colored in its acidic form (pH=0) and yellow in its basic form (pH=4). Rapid acid-base color changes were achieved after 2 months of cycling between acid and base test solutions.

Table I, below shows the performance of representative indicator-polymer compositions.

TABLE I.—SUMMARY OF POLYVINYL ALCOHOL-UNSATURATED ALDEHYDE INDICATOR POLYMERS

| Substrate | Indicator | pH, color | Cycled between pH's | Remarks | Utility |
|---|---|---|---|---|---|
| PVA-acrolein | p-Aminoazobenzene | pH=0: pink; 1: deep orange; 2: medium orange; 3: light yellow; 4 and above: yellow. | 1 and 4 | Reversed fairly well after 286 cycles; films rapidly became orange in pH=0 and yellow in pH=4; medium amount of degradation on standing one month in acidic and basic forms. | Good |
| Do | 4-amino-2′, 3-dimethyl-azobenzene. | pH=0: pink; 2 and above: yellow. | 0 and 3 | Reversed fairly well after 286 cycles; films rapidly became pinkish orange in pH=0; yellow in pH=3; excellent stability on standing one month in basic form; slight degradation on standing one month in acidic form. | Do. |
| Do | 2-methoxy-4-(o-methoxy-phenylazo)-aniline. | pH=1 and below: deep rose; 2: light rose; 3: dusty orange; 4 and above: yellow. | 1 and 4 | Very good; after 286 cycles, films reversed very rapidly and with very easily distinguishable color change although somewhat lessened in intensity from original colors; excellent stability on one month's standing in basic form; good stability on one month's standing in acidic form. | Excellent. |
| PVA-methacrolein | p-Aminoazobenzene | pH=1: pink; 2: orange; 3 and above: yellow. | 1 and 4 | Very good; after 286 cycles, films reversed very rapidly and with easily distinguishable color change although somewhat lessened in intensity from original colors; excellent stability on standing one month in acidic and basic forms. | Do. |
| Do | 4-amino-2′, 3-dimethyl-azobenzene. | pH=1: pinkish orange; 2 and above: yellow. | 0 and 3 | Very good response after 350 cycles; some degradation on standing one month in acidic and basic forms. | Good. |
| Do | 4-(p-aminophenylazo)-benzoic acid. | pH=0: pink; 2: orange; 3 and above: yellow. | 0 and 3 | Color change slow (within ½ hour) but good after 350 cycles; good to excellent stability on one month's standing in acidic and basic forms. | Do. |

EXAMPLE I

A series of polyvinyl alcohol-methacrolein reaction products were prepared by placing heat cured polyvinyl alcohol film having a thickness of at least 4 mils into methacrolein-containing formulations. Two formulations were used, one comprising 10 parts of methacrolein, 80 parts of ethanol, 9 parts of water, and 1 part of concentrated sulfuric acid, and the second, a stronger formulation comprising 10 parts of methacrolein, 8 parts of ethanol, 9 parts of water, and 1 part of concentrated sulfuric acid. The polyvinyl alcohol films were immersed in the methacrolein formulation for periods ranging from a quick dip, to 20 minutes in increments of 5, 10, and 20 minutes.

The resulting films were dyed by briefly immersing them in a dilute acetone solution of 4-amino-2′,3-dimethylazobenzene. The dyed films were then washed with ethanol and dried. The dyed films were pinkish orange in the acid form at pH=1 and yellow at pH=2 or above, i.e., in the basic form. The indicator changed color rapidly after an initial conditioning exposure to the test solutions of about 12 hours. Good response to pH changes was obtained after 350 cycles.

EXAMPLE II

Polyacrolein powder (Shell's Aldomer 110) was dyed by immersion in a dilute acetone solution of p-aminoben-

What is claimed is:
1. An optical pH indicator comprising a colorimetrically sensitive aromatic aminoazo dye and an inert polymer which is stable to acid and base systems and containing carbonyl radicals capable of reactions with said dye.
2. An optical pH indicator comprising a colorimetrically pH sensitive aromatic aminoazo dye and a polymeric material selected from the group consisting of (1) polymers of unsaturated aldehydes having from 3–4 carbons; (2) graft copolymers of polyvinyl alcohol and an unsaturated aldehyde having from 3–4 carbon atoms.
3. The composition of claim 2 wherein dye is 4-amino-2′,3-dimethylazobenzene.
4. The composition of claim 2 wherein dye is p-aminoazobenzene.
5. The composition of claim 2 wherein the dye is 2-methoxy-4-(o-methoxyphenylazo)-aniline.
6. The composition of claim 2 wherein the dye is p-amino-$\alpha,\alpha'$-azonaphthalene.
7. The composition of claim 2 wherein the dye is benzeneazo-$\alpha$-naphthylamine.
8. The composition of claim 2 wherein the dye is 4-(p-aminophenylazo)-benzoic acid.
9. The composition of claim 2 wherein the polymeric material is a polyvinyl alcohol-acrolein graft copolymer.
10. The composition of claim 2 wherein the polymeric material is a polyvinyl alcohol-methacrolein graft copolymer.

References Cited

UNITED STATES PATENTS 3,146,070  8/1964  Collins _____ 252—408 XR
2,915,373  12/1959  Wenker _____ 23—253
2,888,452  5/1959  Schmid et al. _____ 117—15 XR JOHN T. GOOLKASIAN, Primary Examiner M. E. McCANISH, Assistant Examiner U.S. Cl. X.R.

23—253